US008447606B2

(12) United States Patent
Neubacher et al.

(10) Patent No.: US 8,447,606 B2
(45) Date of Patent: May 21, 2013

(54) METHOD AND SYSTEM FOR CREATING OR UPDATING ENTRIES IN A SPEECH RECOGNITION LEXICON

(75) Inventors: Andreas Neubacher, Eindhoven (NL); Gerhard Grobauer, Eindhoven (NL)

(73) Assignee: Nuance Communications Austria GmbH, Vienna (AT)

( * ) Notice: Subject to any disclaimer, the term of this patent is extended or adjusted under 35 U.S.C. 154(b) by 874 days.

(21) Appl. No.: 12/449,362

(22) PCT Filed: Feb. 4, 2008

(86) PCT No.: PCT/IB2008/050398
§ 371 (c)(1),
(2), (4) Date: Oct. 27, 2009

(87) PCT Pub. No.: WO2008/096310
PCT Pub. Date: Aug. 14, 2008

(65) Prior Publication Data
US 2010/0057461 A1 Mar. 4, 2010

(30) Foreign Application Priority Data
Feb. 6, 2007 (EP) ...................................... 07101813

(51) Int. Cl.
*G10L 15/00* (2006.01)
(52) U.S. Cl.
USPC ............................ 704/243; 704/251; 704/260
(58) Field of Classification Search
USPC ......................................... 704/243, 260, 251
See application file for complete search history.

(56) References Cited

U.S. PATENT DOCUMENTS

| 7,043,431 B2 * | 5/2006 | Riis et al. ....................... 704/259 |
| 2004/0128132 A1 * | 7/2004 | Griniasty ....................... 704/254 |
| 2007/0288241 A1 * | 12/2007 | Cross et al. ................. 704/270.1 |
| 2009/0048843 A1 * | 2/2009 | Nitisaroj et al. .............. 704/260 |

FOREIGN PATENT DOCUMENTS

| WO | WO 98/45834 | 10/1998 |
| WO | WO 98/45834 A | 10/1998 |

OTHER PUBLICATIONS

International Search Report mailed May 28, 2008 from PCT/IB2008/050398, filed Feb. 4, 2008.
International Search Report dated May 28, 2008 relating to PCT/IB08/050398.

* cited by examiner

*Primary Examiner* — Daniel D Abebe
(74) *Attorney, Agent, or Firm* — Wolf, Greenfield & Sacks, P.C.

(57) ABSTRACT

In a method and a system (20) for creating or updating entries in a speech recognition (SR) lexicon (7) of a speech recognition system, said entries mapping speech recognition (SR) phoneme sequences to words, said method comprising entering a respective word, and in the case that the word is a new word to be added to the SR lexicon, also entering at least one associated SR phoneme sequence through input means (26), it is provided that the SR phoneme sequence associated with the respective word is converted into speech by phoneme to speech conversion means (4.4), and the speech is played back by playback means (28), to control the match of the phoneme sequence and the word.

9 Claims, 5 Drawing Sheets

METHOD AND SYSTEM FOR CREATING OR UPDATING ENTRIES IN A SPEECH RECOGNITION LEXICON

FIELD OF INVENTION

The present invention relates to a method for providing entries in a speech recognition (SR) lexicon of a speech recognition system, said entries mapping speech recognition (SR) phoneme sequences to words, said method comprising receiving a respective word, and if the respective word is a new word to be added to the speech recognition lexicon, also receiving at least one associated SR phoneme sequence through input means.

Moreover, the invention relates to a system for providing entries in a speech recognition lexicon of a speech recognition system, said entries mapping speech recognition phoneme sequences to words, said system comprising word and SR phoneme sequence input means which are associated with said lexicon.

BACKGROUND OF THE INVENTION

Speech recognition (SR) is used to automatically convert speech to text (speech-to-text conversion). More in detail, sound (speech) is converted first into SR phoneme sequences. Normally, this is a statistical process, i.e. a set of possible phoneme sequences with varying probabilities is produced for any given utterance. Then, SR phoneme sequences are looked up in an SR lexicon that provides a mapping of SR phoneme sequences to words. Furthermore, additional algorithms (e.g. based on a language model or on grammars) are applied to generate a final textual transcription of the utterance.

The inverse process to speech recognition is speech synthesis (text-to-speech conversion). Here, a given text is converted into an enhanced phoneme sequence, that is a phoneme sequence which is enhanced with prosody (pitch, loudness, tempo, rhythm, etc.), which is then converted into sound, i.e. synthetic speech.

The SR lexicon is a means for mapping SR phoneme sequences to words. When words are added to an SR lexicon, one or more SR phoneme sequences representing the pronunciation(s) of the word are given. This can either be generated automatically (by well-known methods) or manually by the author (the user of the speech recognition system), or by somebody in an administrative/maintenance role on behalf of the author.

If there is a mismatch between SR phoneme sequences stored in the SR lexicon of a speech recognition system (i.e. the "expected pronunciations") and the actual pronunciations used by an author, misrecognitions will occur, and the performance of the system will be bad. Therefore, the quality of the phonetic transcriptions is important.

It is also well known that prior art methods for automatically generating phonetic transcriptions do not produce "correct" results (i.e. SR phoneme sequences representing actual pronunciations) for "special" words such as acronyms because pronunciation does not follow regular rules: e.g. "NATO" is pronounced as one word, whereas for "USA" the letters U-S-A are pronounced separately.

Furthermore, authors are normally untrained in phonetic transcription and cannot be expected to produce correct transcriptions in a phonetic alphabet such as SAMPA or IPA.

Therefore, a known technique for allowing authors to guide the automatic phonetic transcription process is to let them use a "spoken like" text: instead of passing the special word to the system, at least one ordinary word that is pronounced similarly to the special word may be entered. In the example above, the "spoken like" text for "NATO" would be "nato". The automatic phonetic transcription would then generate an SR phoneme sequence for the whole word. On the other hand, the "spoken like" text for "USA" would be "you ess a" (resulting in an SR phoneme sequence similar to spelling the separate letters). However, it is often not easy for authors to find "ordinary" words that closely represent the pronunciation of the "special" word. Another known method is to have authors speak the word and try to derive the SR phoneme sequence form the author's utterance using so-called "phoneme recognition". This method is error prone and sensitive to noise, unclear pronunciation, etc.

In US 2005/0203738 A1, a learning technique is disclosed which is addressed to the above problem. As a solution, it is suggested to employ a speech-to-phoneme module that converts a speech into a phonetic sequence; furthermore, a text-to-phoneme component is provided to convert an inputted reference text into one or more text-based phonetic sequences. The text-based phonetic sequences are aligned in a table with the speech-based phonetic sequence, and a phonetic sequence for representing the speech input is determined. However, it is not possible for the author to judge the quality of the transcription. As an example, it is assumed that the word "route" is given; when typing this word to input it, the system might generate a phonetic transcription corresponding to a pronunciation similar to "root", whereas the user e.g. pronounces the word similar to "rowt". When the generated pronunciation is used later on by the speech-to-text system, the system would not recognize the word "route" when the user says "rowt". Furthermore, when the user says "root", the system would recognize the word "route", which was not what the user meant to say.

SUMMARY OF THE INVENTION

It is an object of the present invention to provide a method and a system as stated above which render it possible to allow authors/users to create proper SR phoneme sequences so that a mismatch between such SR phoneme sequences stored in an SR lexicon and the actual pronunciation are avoided as far as possible.

Thus, according to a first aspect of the invention, a method is provided for providing entries in a speech recognition lexicon of a speech recognition system, said entries mapping speech recognition phoneme sequences to words, said method comprising receiving a respective word, and if the respective word is a new word to be added to the speech recognition lexicon, also receiving at least one associated phoneme sequence through input means, and converting the associated phoneme sequence into speech by phoneme to speech conversion means, and playing back the speech to enable control of the match of the phoneme sequence and the respective word.

Further, according to a second aspect, the invention provides a system for providing entries in a speech recognition lexicon of a speech recognition system, said entries mapping speech recognition phoneme sequences to words, said system comprising word and SR phoneme input means which are associated with said lexicon; this system being characterized in that phoneme to speech conversion and playback means are associated with said lexicon for selectively converting phoneme sequences stored in the lexicon into speech, and for playing back the speech.

According to the present invention, the author or user is provided with an audio feedback by playing back the generated phonetic transcription so that she/he can check whether the generated transcription corresponds to the intended pronunciation. The result obtained depends upon how well the phonemes-to-speech algorithm used matches the speech-to-phonemes algorithm employed in the speech-to-text system where the phonetic transcription is used. In the improved case, the sound produced by the text-to-speech system closely corresponds to the pronunciation expected by the speech-to-text system. Thereby, authors can hear whether the respective SR phoneme sequence matches their pronunciation, and this will lead to correct speech recognition. If there is a mismatch, authors can iterate the process by modifying the manually entered SR phoneme sequence or a "spoken like" text until a match is reached.

Clearly, this mechanism can also be used to replace, i.e. update, SR phoneme sequences associated with words already stored in the lexicon with better ones. Furthermore, this feedback mechanism can be used to guide authors towards proper pronunciation. If authors are not allowed to modify phonetic transcriptions, e.g. because these are generated by somebody in an administrative/maintenance role, they can "listen" to the expected pronunciations, and can adjust their way of speaking such that the speech-to-text system can correctly recognize their utterances.

This solution according to the invention is of course different from the usual intention at text-to-speech systems where a sound similar to a human voice as far as possible is to be generated. Contrary to this, according to the invention, the respective phoneme sequence is read to the author (or a context administrator responsible for creating/updating the lexicon entries) as far as possible in such a manner that the SR system would recognize the corresponding word with highest probability if the author would utter the word in the same manner.

It should be mentioned that from US 2004/0073423 A1, a speech-to-text-to-speech system is already known; however, this system is used to provide an on-line and real time transmission of speech with a small bandwidth from the source, that is a first place, to a destination, that is a second place. To this end, speech is converted into digital text data which then are transmitted via a channel having a small bandwidth to the destination where the text is re-converted into speech, e.g. to complete phone conversation.

With the method and system according to the invention, the mapping entries in an SR lexicon may be optimized. If a user (author) is not satisfied with a given phonetic transcription, there are three possibilities to improve:
(1) Instead of the original word, an alternative spoken like-text can be provided and entered by typing and following conversion that better describes the desired pronunciation of the word. With respect to the above example, the user could enter the spoken like-text "rowt" to tell the system how the word "route" will be pronounced. Thereafter, the process of generating a phonetic transcription etc. is repeated using this spoken like-text instead of the original word.
(2) Instead of using the generated phoneme sequence, it is possible to manually enter a new phoneme sequence, and to play back the corresponding sound.
(3) The user could learn to pronounce the word in the way the speech-to-text system expects it to be pronounced. In the given example, the user could learn to say "root" if the word "route" should appear in the text.

Accordingly, in conformity with preferred embodiments of the invention, it may be provided that the associated phoneme sequence as entered into the lexicon is automatically generated by phonetic transcription; that the word to be added is converted into the associated phoneme sequence by phonetic transcription; that a word that is spoken like the respective word to be added is converted into the associated phoneme sequence by phonetic transcription; and that the associated phoneme sequence is manually entered into the lexicon.

Further, to obtain best mapping results, it is provided that the conversion as applied to the phoneme sequence to obtain speech is at least substantially an inverse of the conversion as realized by the phonetic transcription.

Moreover, it is advantageous if there is a mismatch between the speech as played back and the word, a modified phoneme sequence is entered, or a modified word spoken like the word to be added is entered to be converted into a modified phoneme sequence by phonetic transcription, said modified phoneme sequence being stored thereafter in the lexicon.

To produce speech which can be understood well, it is suitable to enhance the phonemes with prosody (pitch, loudness, tempo, rhythm, etc.) in a manner known per se.

As far as the system according to the invention is concerned, it is particularly advantageous if the phoneme to speech conversion means for converting phoneme sequences into speech are at least substantially an inverse of the phonetic transcription means.

Then, it is advantageous if the word and SR phoneme sequence input means comprise means for manually entering words and/or texts which are spoken like said words, and means for converting the words or spoken-like texts into SR phoneme sequences.

A further preferred embodiment of the present system is characterized by input means for manually entering phoneme sequences into the lexicon.

Moreover, it is preferred that the phoneme to speech conversion means comprise phoneme enhancement means for enhancement of generated phoneme sequences with prosody.

BRIEF DESCRIPTION OF THE DRAWINGS

The invention will be further described now with reference to preferred embodiments shown in the drawings to which, however, the invention should not be restricted.

DETAILED DESCRIPTION OF THE INVENTION

Figure 1:
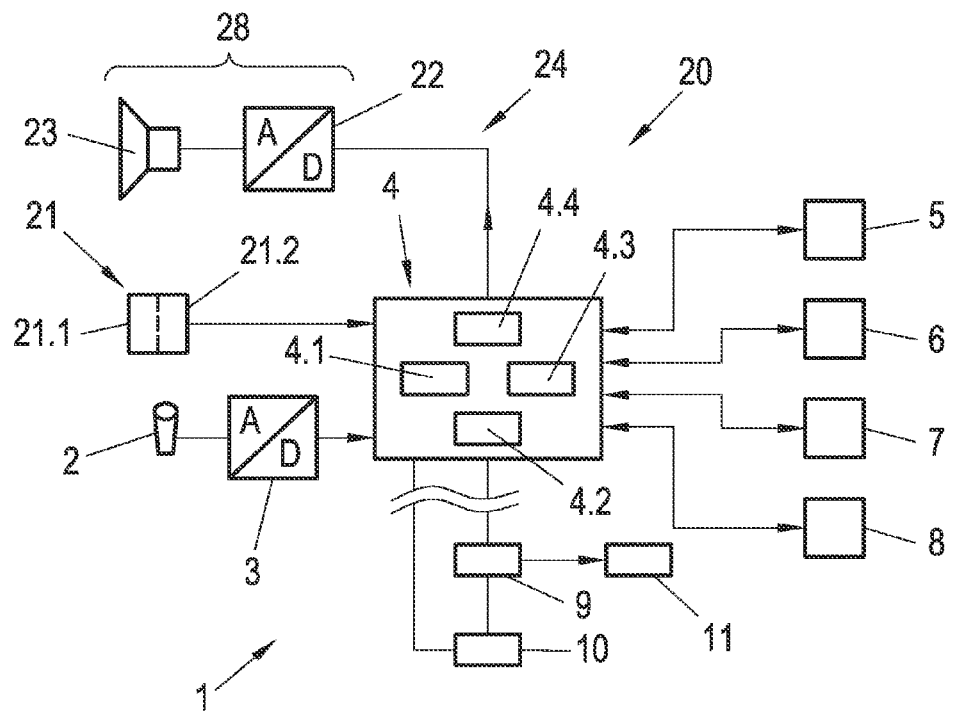
FIG. 1 shows a speech recognition system including a system for creating/updating entries into the speech recognition lexicon of the speech recognition system in accordance with the present invention.

In FIG. 1, a schematic representation of a speech recognition system 1 is shown which is used to automatically transcribe a spoken text into a text file. This speech recognition system 1 comprises sound input means 2, i.e. a microphone, an A/D-converter 3 which converts the analogous audio signal of the microphone 2 into digital audio data which are applied to specific speech recognition means 4 which usually are realized by computer means 4 in combination with respective software modules and data modules. In particular, it is usual to use an acoustic reference data model 5 containing phonetic characteristics for the respective user, a language data model 6 to consider specific probabilities for word transitions dependent on the specific user and a lexicon data model 7 which contains recognizable words including information how they are pronounced by the specific users. Furthermore, it is also possible to use a grammar data model 8 where data referring to number grammar, date grammar etc. are included. For the present invention, the speech recognition (SR) lexicon data model 7, in the following in short called SR lexicon 7, is of particular interest since the SR lexicon contains words and SR phoneme sequences which are mapped to the stored words. The speech recognition means 4 comprise, as usual, a speech-to-SR phoneme sequence conversion component 4.1 as well as a SR phoneme sequence-to-text conversion component 4.2 from where the resulting text is supplied to a word processing station 9, for instance via a LAN/WAN network, the word possessing station 9 having associated therewith text correction means 10 as well as output means 11, as is well known in the art, and does not need further description.

Figure 2:
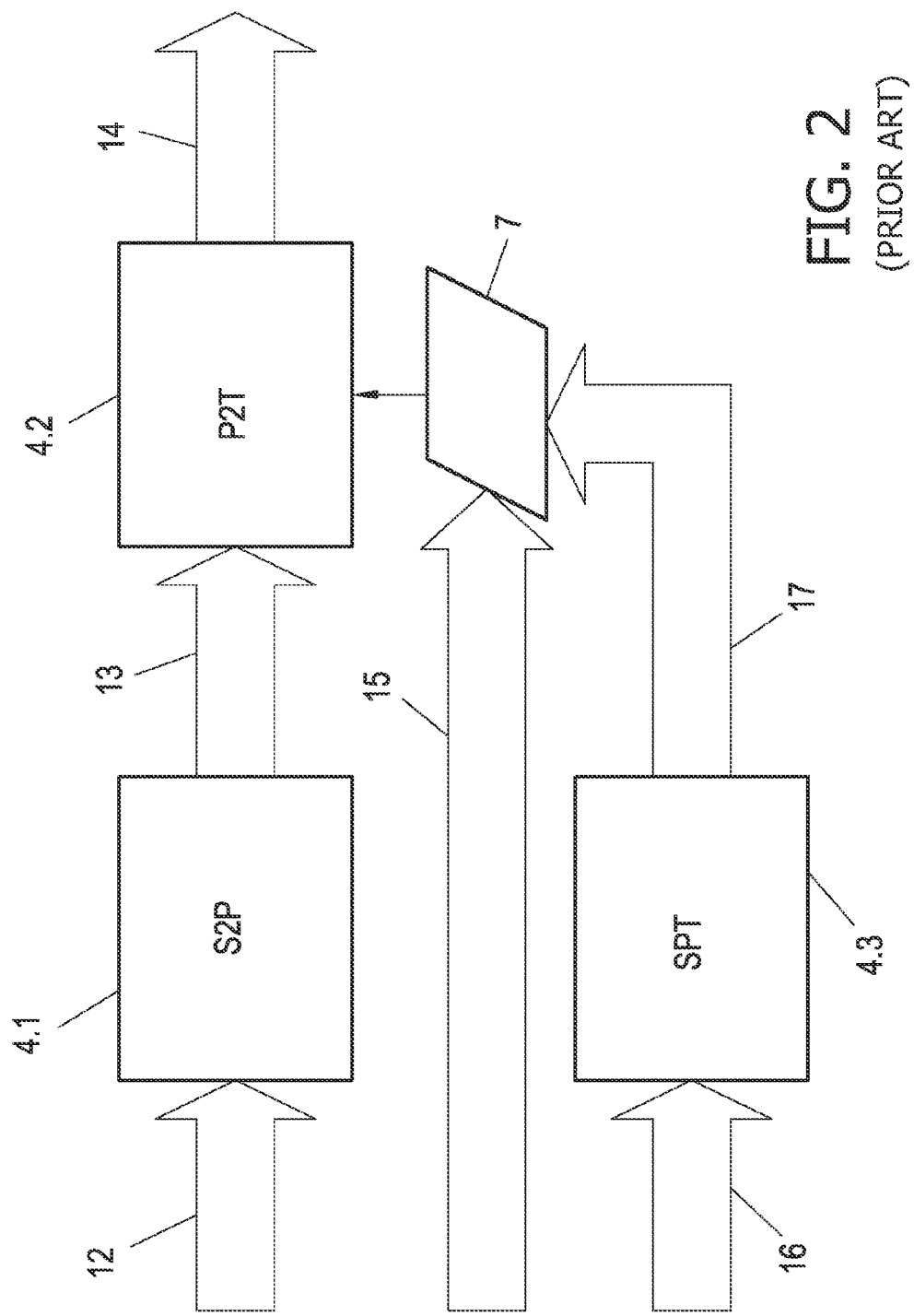
FIG. 2 illustrates in a rather schematic manner a usual speech recognition technique.

When new words are to be added to the SR lexicon 7, or words which are already stored in the SR lexicon, and the corresponding SR phoneme sequences have to be improved, such words and the corresponding one or more SR phoneme sequences have to be entered into the SR lexicon 7. A prior art process therefore is schematically shown in FIG. 2 where in addition, usual speech recognition is illustrated according to which at 12, sound (speech) is supplied to a speech-to-SR phoneme sequence conversion (S2P) component 4.1; this S2P component 4.1 provides SR phoneme sequences at its output which are supplied at 13 to an SR phoneme sequence-to-text conversion component (P2T component) 4.2 which outputs the recognized text at 14. During this conversion, the contents of SR lexicon 7 is used, namely a mapping of SR phoneme sequences to words.

Now, when words are added to the SR lexicon 7, one possibility is to manually enter the word to be added to the SR lexicon 7 (or the word to be amended) together with a specific SR phoneme sequence, as is shown in FIG. 2 with an arrow 15. An alternative possibility is to enter the word to be added to the SR lexicon 7 or a "spoken like" text. A "spoken like" text is a word which is spoken like the word to be added, as for instance the word "route" and the spoken like text "root", see the above-mentioned example. In this case which is shown at 16 in FIG. 2, then a statistical phonetic transcription component (SPT component) 4.3 is employed where one or more SR phoneme sequences are generated in correspondence with the word to be added to the SR lexicon 7, or a text (word) spoken like this word (which thereafter is called in short "spoken-like word"). The word and the generated SR phoneme sequence(s) are then entered into the SR lexicon 7 according to arrow 17 in FIG. 2.

It is a disadvantage of this known technique that mismatch may occur between SR phoneme sequences now stored in the SR lexicon 7 of the speech recognition system 1 and the actual pronunciations used by the person speaking a text, that is the user of the speech recognition system 1 or in short the author. Due to such mismatch, speech mis-recognition will occur. To avoid such mis-recognition as far as possible, a good quality of the phonetic transcriptions (i.e. of the SR phoneme sequences, that is the sequences of phonemes that are used by the speech recognition system in standard phonetic alphabet such as SAMPA) is required.

Accordingly, to achieve such phonetic transcription of good quality, the invention provides for a sound feedback loop by employing additional components which constitute a system 20 for creating or updating entries in the SR lexicon 7 of the speech recognition system 1. This system 20 comprises, in addition to the means 2, 3, 4, and in addition to input means 21 for inputting specific words (compare input portion 21.1) and, if wished, of SR phoneme sequences (compare input portion 21.2), a phoneme-to-speech conversion component (P2S component) 4.4, D/A-converter means 22 and a loudspeaker 23. Thus, a feedback loop 24 is realized which in particular comprises the means 4.4, 22 and 23.

Figure 3:
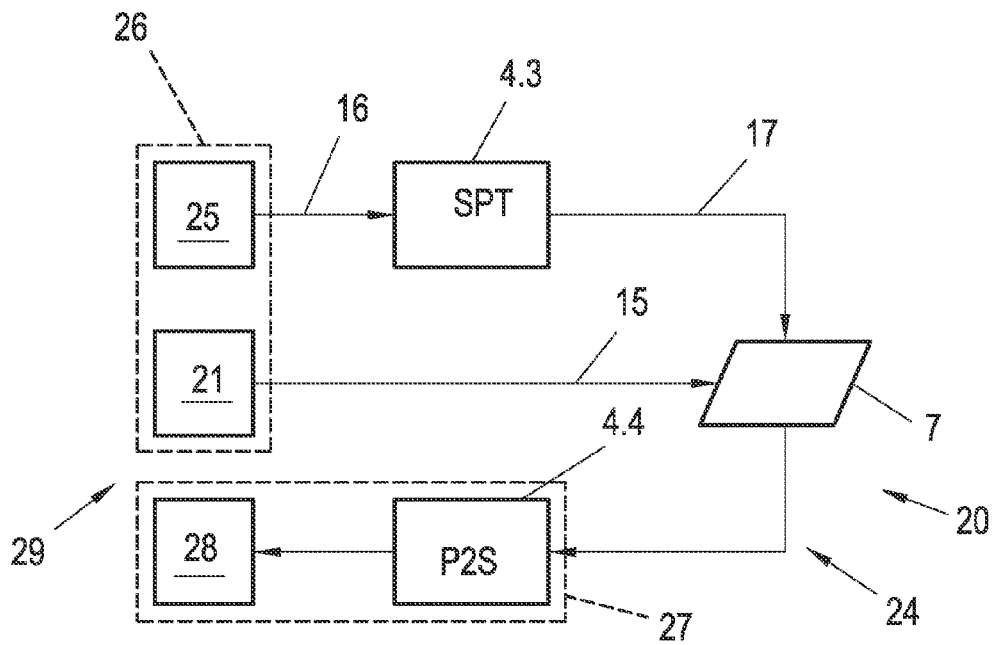
FIG. 3 schematically shows the system for creating or updating entries in a speech recognition lexicon with the speech feedback loop according to the present invention.

In FIG. 3, a schematic diagram is shown which is in principle similar to that of FIG. 2, but now enhances said feedback loop 24. More in detail, the input means 21 for manually inputting the respective words and the corresponding SR phoneme sequences (compare arrow 15) are shown as well as input means 25 for inputting the respective words or spoken like words in text form to the SPT component 4.3 (see arrow 16) where the SR phoneme sequences are provided which—of course together with the respective words—are then supplied to the SR lexicon 7. The input means 21 and 25 (in fact in combination with the SPT component 4.3) form general input means 26. Then, to be able to check the word entries and phoneme sequences entries caused in the SR lexicon 7, the feedback loop 24, and accordingly the present system 20, comprises phoneme-to-speech conversion and playback means 27 which, more in detail, comprise a phoneme-to-speech conversion component 4.4 as well as specific playback means 28 which contain the A/D-converter 22 and the loudspeaker 23 of FIG. 1.

This feedback loop means 24 allows to check whether the given or now generated SR phoneme sequence is correct, and corresponds to the author's pronunciation. The author can hear whether the SR phoneme sequence matches his/her pronunciation, and thus is in the position to check whether there is a SR phoneme sequence of good quality, so that good speech recognition results are obtained. In the case of a mismatch, the author can iterate the process by modifying the manually entered SR phoneme sequence or by entering a spoken like text until a good match is reached. As already mentioned, it is clear that this mechanism can also be used to replace SR phoneme sequences associated with words already stored in the lexicon 7 with better ones that is to update the entries. Furthermore, the feedback loop 24 gives the possibility to guide authors to a proper pronunciation. If authors are not allowed to modify phonetic transcriptions, for instance since these phonetic transcriptions are generated by persons in an administrative/maintenance group, namely by a so-called context administrator, the authors can listen to the expected pronunciation played back by the loudspeaker means 23, and can adjust their way of speaking such that the speak recognition system 1 can correctly recognize the utterances, and can output correct text files.

Figure 4:
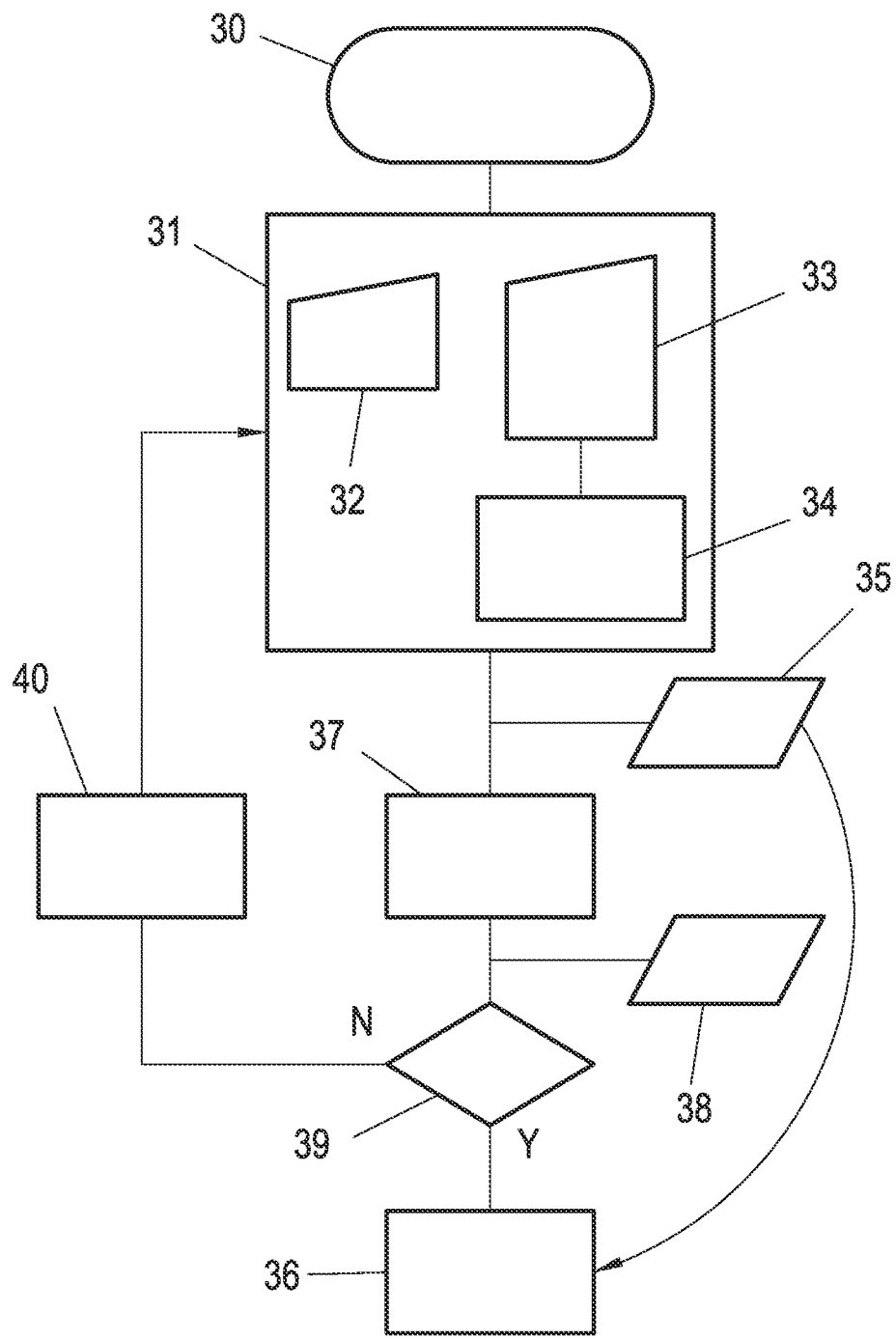
FIG. 4 shows a flowchart to illustrate the feedback loop method according to the present invention.

FIG. 4 illustrates a flowchart showing the most important steps for the present "feedback loop"-method. It is assumed that the user or author wants to add a word to the SR lexicon 7, or that he wants to improve the phonetic transcription of an existing word in the SR lexicon 7. Therefore, after the process start according to a start step 30, block 31 follows according to which two alternatives for generating SR phoneme sequences are offered. According to the one alternative, the user manually types the respective SR phoneme sequence, compare block 32 in FIG. 4. The other possibility, according to block 33, is that the word or a spoken-like word is entered by typing, to generate the intended SR phonetic transcription automatically. This phonetic transcription, namely the respective SR phoneme sequence, is then generated by the SPT component 4.3 (compare FIG. 3) according to block 34, and the SR phoneme sequence obtained thereby is then entered into the SR lexicon 7 according to block 35 in FIG. 4, and is stored there together with the respective word, according to block 36 in FIG. 4.

Additionally, according to block 37 in FIG. 4, speech is generated from this SR phoneme sequence by means of the P2S component 4.4, and the generated speech is played back according to block 38, to render it possible to check the matching of the respective SR phoneme sequence. Then, according to check block 39, it is checked whether the user is satisfied with the pronunciation, and if so, the stored entries in the lexicon 7 are confirmed, see block 36. If not, the user is allowed to enter a modified spoken-like word or to modify the manually typed SR phoneme sequence, compare block 40 in FIG. 4, and the process reverts to block 31 where the modifications are entered as described above.

Figure 5:
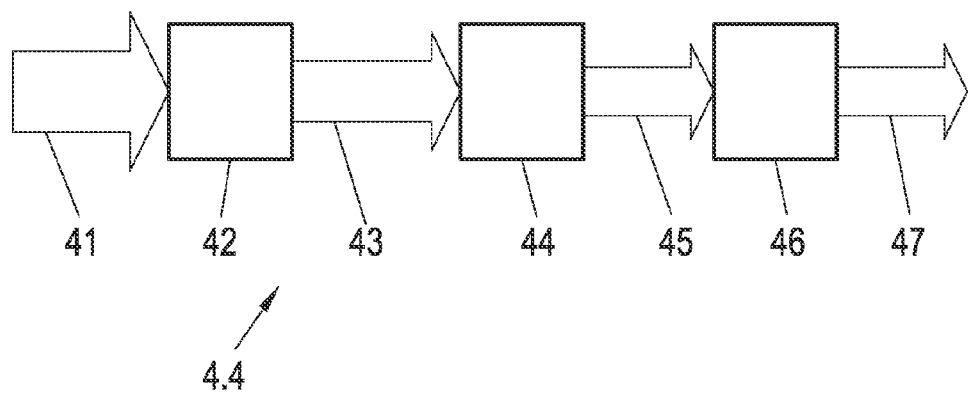
FIG. 5 shows the functional modules of the phoneme to speech conversion component as used in the speech feedback loop of the system according to the present invention.

In FIG. 5, the function and modules of the P2S component 4.4 are schematically illustrated. At 41, the respective SR phoneme sequence is supplied to a first conversion step, that means to a conversion module 42 converting the supplied SR phoneme sequence to a standard phonetic alphabet. The result is the respective SR phoneme sequence in a standard phonetic alphabet, e.g. SAMPA, which is outputted and supplied at 43 to a second step, an enhancement step, or to an enhancement module 44 for enhancing the phoneme sequence with prosody, namely pitch, loudness, tempo, rhythm, etc. The such enhanced SR phoneme sequence is then supplied at 45 to a module 46 for converting the enhanced phoneme sequence to speech from where, thereafter, the synthesized speech or sound is outputted at 47.

Figure 6:
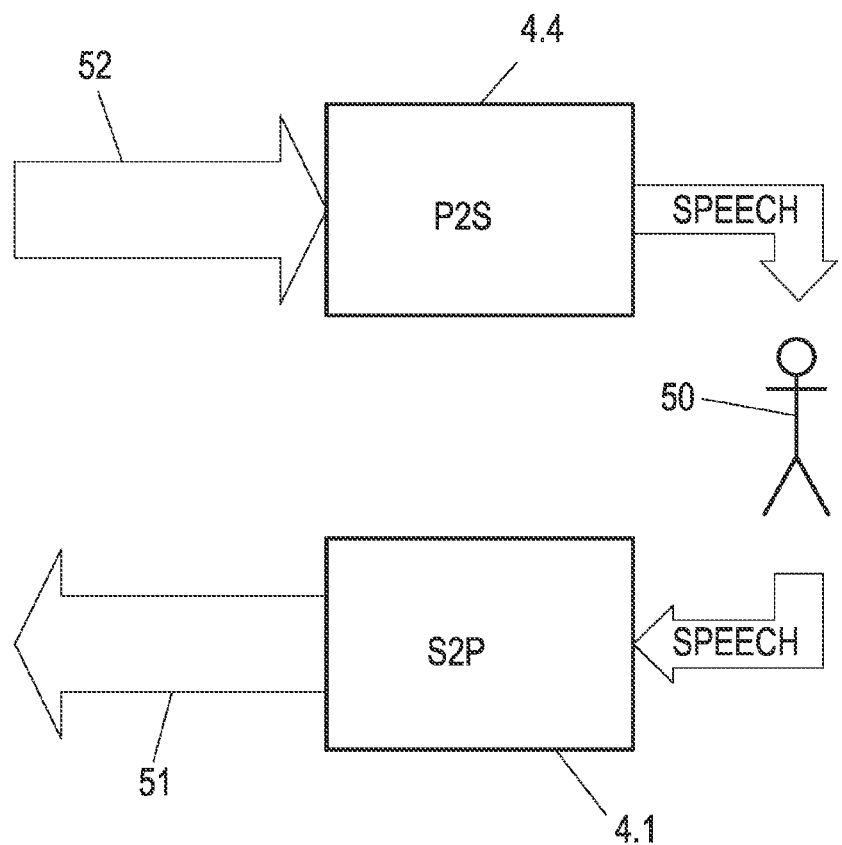
FIG. 6 illustrates in a schematic manner a so-called weak identity property technique which is employed to tune the phoneme to speech conversion to fit to the speech to SR phoneme sequence conversion.

It should be mentioned that the respective modules or components as employed in the present method or system in principle are known in the art and need no further detailed description. It should however be mentioned that it should be intended to have a P2S component 4.4, that is modules 42, 44, 46, which are at least nearly the exact inverse of the S2P component 4.1 (compare FIG. 1) so that the sound which is produced by the text-to-speech system, in particular by the P2S component 4.4, corresponds exactly to the pronunciation expected by the speech-to-text system, in particular the S2P component 4.1. To this end, the P2S component 4.4 may be tuned such that if produced speech is fed into the S2P component 4.1, for instance via an author 50 as shown in FIG. 6, the resulting set of SR phoneme sequences obtained at 51 in FIG. 6 contains the input SR phoneme sequence as entered at 52 in FIG. 6. Thereby, SR phoneme sequences are obtained which are suited to improve the speech recognition accordingly.

As a further example with respect to the design of the P2S component 4.4, it may be mentioned in the case that e.g. the P2S component 4.1 ignores pitch and loudness, but is sensitive to pauses, pauses should be stressed to make the author aware of the significant aspects of pronunciation. For instance, for "U.S.A" a spoken-like word such as "you ess eye" (assuming that the spaces are interpreted as pauses) should result in speech with significant pauses between the syllables, whereas a spoken-like word such as "youesseye" should result in pronunciation of a single word.

Figure 7:
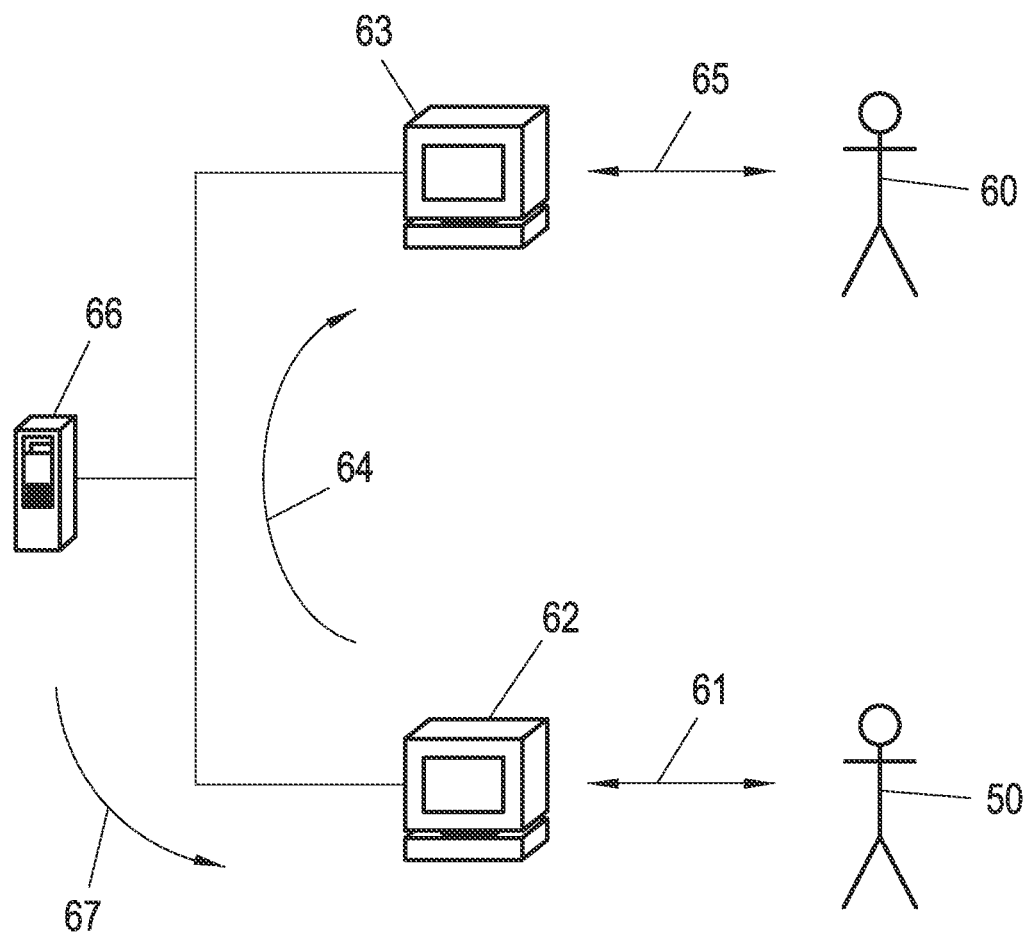
FIG. 7 illustrates a scheme for the situation that a separate context administrator generates phonetic transcriptions for new words.

As a specific use case, FIG. 7 illustrates the situation when new words are added by a context administrator 60 (and not by an author). Here, an author 50 creates new documents which, according to arrow 61, are entered for instance in word station or the like computer means 62 comprising or realizing, respectively, a speech recognition system in accordance with FIG. 1. The finished text document (see also output means 11 in FIG. 1) is sent to further computer means 63 according to arrow 64 in FIG. 7. The context administrator 60 then, according to arrow 65, generates phonetic transcriptions for new words as screened by the computer means 63 which, in fact, form input means 26 as shown in FIG. 3. The new words are then added together with the corresponding phonetic transcriptions (SR phoneme sequences) to the SR lexicon 7 (FIG. 3) which for instance is comprised by a server 66 as shown in FIG. 7. Here, the updated SR lexicon entries are then available according to arrow 67 for the author 50 through his/her computer means 62.

With respect to the components 4.1 and 4.4, it has been mentioned above that they should be consistent to each other, and it is accordingly preferred that the format for representing phonetic transcription should be identical in these components 4.1 and 4.4; in an alternative embodiment, means could be provided to convert the format used in component 4.1 to the format used in component 4.4 and vice versa. In any way, it is preferred that the speech synthesis algorithm of component 4.4 is consistent with a phoneme extraction algorithm of component 4.1.

It should also be clear that the computer means, in particular the speech recognition means 4 of FIG. 1 have a number of further functions, as in particular specific control functions, e.g. to enable the author (the user) to enter words or phoneme sequences (graphemes) in the correct order at the correct times, and/or to request such entries, as well as to manage internal data transfers, for instance to transmit the phonetic transcriptions (SR phoneme sequences) for specific storing, or playing back, and so on. However, these functions are in principle well known in the art and need no further explanation. In particular, it should be noted that exact user interactions are not relevant. It could for instance be possible for the user to generate and verify multiple transcriptions, and to combine or mix the respective steps as described above in connection with FIGS. 1, 3, 4, 5 and 7. In any case, it is important that an audible feedback is provided for which is based on the phonetic transcription that is intended to be used by the speech-to-text system.

The invention claimed is:

1. A method for providing entries in a speech recognition (SR) lexicon of a speech recognition system, said entries mapping speech recognition (SR) phoneme sequences to words, said method comprising:
    receiving a respective word, and if the respective word is a new word to be added to the speech recognition (SR) lexicon, also receiving a first associated SR phoneme sequence;
    converting the first associated SR phoneme sequence into an audio representation;
    playing back the audio representation as speech to enable control of a match of the SR phoneme sequence and the respective word;
    receiving, via an input interface, a second associated SR phoneme sequence associated with the respective word; and
    updating the SR lexicon based, at least in part, on the second SR phoneme sequence.

2. The method according to claim 1, wherein the first associated SR phoneme sequence as received by the SR lexicon is automatically generated by phonetic transcription.

3. The method according to claim 2, wherein the respective word to be added is converted into the first associated SR phoneme sequence by phonetic transcription.

4. The method according to claim 2, wherein a spoken word like the respective word to be added is converted into the first associated SR phoneme sequence by phonetic transcription.

5. The method according to claim 1, wherein the first associated SR phoneme sequence is manually entered into the lexicon.

6. The method according to claim 2, wherein the conversion as applied to the first associated SR phoneme sequence to obtain the speech is at least substantially an inverse of the conversion as realized by the phonetic transcription.

7. The method according to claim 1, wherein the first SR phoneme sequence is enhanced with prosody when being converted into speech.

8. A system for providing entries in a speech recognition (SR) lexicon of a speech recognition system, said entries mapping speech recognition (SR) phoneme sequences to words, said system comprising:

an audio input interface configured to receive audio comprising speech including a word; and at least one processor programmed to:

determine a first associated SR phoneme sequence for the word;

convert the first associated SR phoneme sequence into an audio representation;

play back the audio representation; and update the SR lexicon based, at least in part, on a second SR phoneme sequence manually entered via a user interface after playing back the audio representation.

9. The system according to claim 8, wherein the at least one processor is further programmed to enhance the first associated SR phoneme with prosody during the conversion to the audio representation.

* * * * *